US007039916B2

(12) United States Patent
Jason, Jr.

(10) Patent No.: US 7,039,916 B2
(45) Date of Patent: May 2, 2006

(54) DATA DELIVERY SYSTEM FOR ADJUSTING ASSIGNMENT OF CONNECTION REQUESTS TO NODES BASED UPON THE TRACKED DURATION

(75) Inventor: James L. Jason, Jr., Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 09/969,110

(22) Filed: Sep. 24, 2001

(65) Prior Publication Data
US 2003/0061356 A1    Mar. 27, 2003

(51) Int. Cl.
*G06F 9/46* (2006.01)
(52) U.S. Cl. ............... 718/105; 709/201; 709/206; 709/224; 709/225; 709/227; 709/238; 710/240
(58) Field of Classification Search ............... 709/200, 709/201–238; 718/100–108; 710/240
See application file for complete search history.

(56) References Cited

U.S. PATENT DOCUMENTS

| | | | | |
|---|---|---|---|---|
| 5,506,968 A * | 4/1996 | Dukes | | 710/240 |
| 5,774,660 A | 6/1998 | Brendel et al. | | |
| 5,799,002 A * | 8/1998 | Krishnan | | 370/234 |
| 5,938,732 A * | 8/1999 | Lim et al. | | 709/229 |
| 6,205,481 B1 * | 3/2001 | Heddaya et al. | | 709/226 |
| 6,516,350 B1 * | 2/2003 | Lumelsky et al. | | 709/226 |
| 6,563,793 B1 * | 5/2003 | Golden et al. | | 370/236 |
| 6,578,077 B1 * | 6/2003 | Rakoshitz et al. | | 709/224 |
| 6,631,118 B1 * | 10/2003 | Jones | | 370/252 |
| 6,658,473 B1 * | 12/2003 | Block et al. | | 709/226 |
| 6,725,272 B1 * | 4/2004 | Susai et al. | | 709/229 |
| 6,766,348 B1 * | 7/2004 | Combs et al. | | 718/104 |
| 6,798,786 B1 * | 9/2004 | Lo et al. | | 370/468 |
| 6,925,482 B1 * | 8/2005 | Gopal et al. | | 709/201 |
| 6,970,925 B1 * | 11/2005 | Springmeyer et al. | | 709/224 |
| 2001/0032263 A1 * | 10/2001 | Gopal et al. | | 709/227 |
| 2001/0042131 A1 * | 11/2001 | Mathon et al. | | 709/238 |
| 2002/0042828 A1 * | 4/2002 | Peiffer | | 709/227 |
| 2002/0049815 A1 * | 4/2002 | Dattatri | | 709/206 |
| 2002/0062454 A1 * | 5/2002 | Fung | | 713/300 |
| 2002/0065930 A1 * | 5/2002 | Rhodes | | 709/232 |
| 2002/0120744 A1 * | 8/2002 | Chellis et al. | | 709/226 |
| 2002/0138618 A1 * | 9/2002 | Szabo | | 709/225 |
| 2002/0174219 A1 * | 11/2002 | Mei et al. | | 709/224 |
| 2003/0043846 A1 * | 3/2003 | Purpura et al. | | 370/468 |
| 2003/0208599 A1 * | 11/2003 | Asano et al. | | 709/226 |
| 2004/0015608 A1 * | 1/2004 | Ellis et al. | | 709/246 |
| 2004/0028209 A1 * | 2/2004 | Fleming et al. | | 379/221.13 |

OTHER PUBLICATIONS

Pai et al, "Locality-Aware Request Distribution in Cluster-based Network Servers", Department of Electrical and Computer Engineering, Rice University, pp. 205-216, ACM, 1998.*

(Continued)

*Primary Examiner*—Meng-Al T. An
*Assistant Examiner*—Jennifer N. To
(74) *Attorney, Agent, or Firm*—Fish & Richardson P.C.

(57) ABSTRACT

The time taken for connection establishment is monitored to aid in selecting load distribution among nodes in a data delivery system, such as a server cluster. The failure of a node to respond to a connection request may be used to identify a crashed node. The number of connections being maintained and the amount of bandwidth being consumed may also be monitored for each node, and this information may be used to determine when a node should be removed from contention for new connection requests and when a node should be reinstated to receive new connection requests.

28 Claims, 7 Drawing Sheets

OTHER PUBLICATIONS

Aron et al., "Cluster Reserves: A Mechanism for Resource Management in Cluster-based Network Servers", Department of Computer Science, Rice University, pp. 90-101, ACM, 2000.*

* cited by examiner

DATA DELIVERY SYSTEM FOR ADJUSTING ASSIGNMENT OF CONNECTION REQUESTS TO NODES BASED UPON THE TRACKED DURATION

BACKGROUND

The present application describes systems and techniques relating to load balancing in a data delivery system, for example, balancing server load in a server cluster.

A network is a collection of nodes coupled together with wired or wireless communication links, such as coax cable, fiber optics or radio frequency bands. Each node is capable of communicating with other nodes over the communication links using networking protocols. A node may be any machine capable of communicating using the network protocol. An inter-network is a collection of computer networks coupled together by routers (also known as gateways) and an inter-networking protocol.

A server cluster is a group of independent data servers, or nodes, coupled with a network and managed as a unified data delivery system. The servers in the cluster cooperate in providing data to requesting client devices. A load balancer or redirector may be used to distribute client requests across the servers within the cluster. Distributing load across different servers allows the server cluster to handle large numbers of concurrent requests and large volumes of requested data, while keeping response time to a minimum.

A load balancer commonly performs two interrelated functions: (1) server selection and (2) request translation. Request translation refers to the conversion of a client request directed to the server cluster generally, into a specific request directed to an individual server within the cluster. Server selection involves choosing an individual server to process a particular client request.

A common example of a server cluster is a web server cluster. A web server provides users with access to data, which is typically in the form of HTML (Hypertext Markup Language) documents and software organized into a web site. Each web server in a conventional web server cluster typically stores identical web site content and typically runs mirroring software to maintain the duplicate content across all the servers in the cluster.

With regard to request translation, traditional approaches to load balancing in a web server cluster include a Domain Name Server (DNS) approach and a reverse proxy approach. In the DNS approach, a local DNS distributes server load by dynamically resolving a domain name for the cluster into different Internet Protocol (IP) addresses for the web servers in the cluster. In a reverse proxy approach, a reverse proxy server translates relative Universal Resource Locators (URLs) in client requests into absolute URLs addressed to one of the web servers in the cluster.

With regard to server selection, a traditional approach, referred to as "round robin," assigns each server in the cluster a position in a logical circle. As each new client request comes in, the load balancer directs the request to the server associated with the next position in the logical circle.

Details of one or more embodiments are set forth in the accompanying drawings and the description below. Other features and advantages may be apparent from the description and drawings, and from the claims.

DETAILED DESCRIPTION

The systems and techniques described here relate to server load balancing. The description that follows discusses server load balancing in the context of IP, but may apply equally in other contexts, for example, any network protocol that uses a connection establishment protocol having a connection request message and a corresponding acknowledgement message. As used herein, the term "message" includes any discrete block of data transmitted over a network, including IP segments, IP packets, and Ethernet frames.

The present inventors developed load-balancing systems and techniques that may better assess server loading and may aid in identifying when a server has crashed. For example, the amount of time taken by each node in a data delivery system to respond to a new connection request, as well as the number of connections being maintained and/or the amount of bandwidth being consumed by each node, may be monitored to determine when a node should be removed from contention for new connection requests and when that node should be reinstated to receive new connection requests. Implementations of the load balancing systems and techniques may include various combinations of the features described below.

Figure 1:
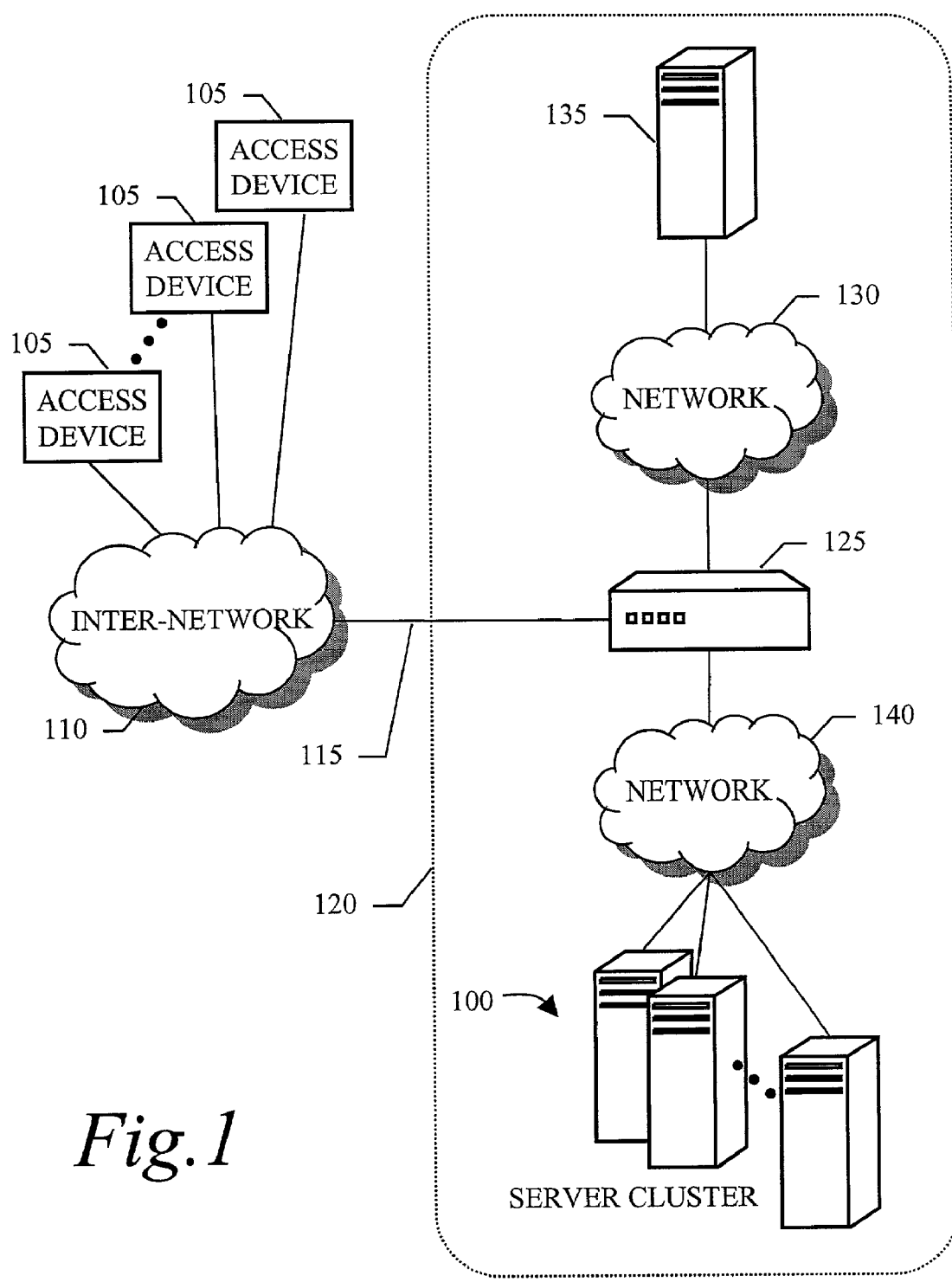
FIG. 1 is a block diagram illustrating an operational environment for a server load balancing system.

FIG. 1 is a block diagram illustrating an operational environment for a server load balancing system. The server load balancing system includes a server cluster 100, which includes two or more data servers. These data servers may be any machines capable of responding to connection requests received through a network by delivering data. For example, the servers in the server cluster 100 may be web servers.

The server cluster 100 receives connection requests from multiple access devices 105, which are coupled with an inter-network 110, such as the Internet. A link 115 connects the inter-network 110 with a network system 120, which contains the server cluster 100.

The network system 120 includes one or more networks 130, 140. The network system 120 may be an autonomous system, such as those in the Internet, which are typically managed by a single entity such as a company, educational institution, government agency, etc. At each ingress/egress point in the network system 120, such as the link 115, a load monitor 125 is attached. Each load monitor 125 monitors network traffic directed to or coming from the server cluster 100. Each load monitor 125 may also report server-loading information to a controller 135. Alternatively, each load monitor 125 reports server-loading information to all other load monitors.

In the example of FIG. 1, only one ingress/egress point is shown, namely link 115. Thus, only one load monitor 125 is used. However, other implementations could have multiple ingress/egress points and could use multiple monitors. In addition, in some configurations, a single load monitor 125 may be used with multiple ingress/egress points. For example, if the server cluster 100 is coupled with a single network 140 within the network system 120, then a single load monitor 125 may be connected with the network 140, and no other load monitors may be needed. However, in certain implementations, at least two load monitors are always provided, because load monitors are provided in pairs, with the second of each pair serving as a backup in case of failure of the first (e.g., hardware failure, software failure, power source failure, etc.). Alternatively, each load monitor is constructed with redundant systems to provide backup functionality.

The network system 120 may consist only of a single load monitor, a single network and two servers. Alternatively, the network system 120 may include many networks, many servers functioning as a virtual server cluster (i.e. the servers within the virtual server cluster are not all connected to the same network but rather are distributed among two or more different networks), and many ingress/egress points to the inter-network 110, with each ingress/egress point having its own load monitor.

Devices inside the network system 120 may also access the server cluster 100. These devices may send messages to the server cluster 100 that do not pass through a load monitor. For example, the controller 135 may have access to the server cluster 100 independently of a data path through a load monitor. Thus, in some implementations, it is unnecessary that all network traffic directed to the server cluster 100 pass through a load monitor.

In addition to monitoring server cluster traffic, the load monitor 125 may also perform server assignment. For example, the network 140 may be an Ethernet or token ring network, and the load monitor 125 may be the only link between the network 140 and all other networks. In this case, the load monitor 125 functions, in part, as a router.

In this example, the load monitor 125 identifies messages directed to the server cluster 100, selects a server in the server cluster 100 for a new connection or identifies the appropriate server in the cluster 100 for an existing connection, and routes the messages to the appropriate servers in the cluster 100 over the Ethernet 140. The individual servers within the server cluster 100 are unknown to devices other than the load monitor 125. For data requesting devices, the server cluster 100 appears to be a single logical machine with a single IP address.

Alternatively, the load monitor 125 reports server-loading information to another device within the network system 120, such as the controller 135 or other machine (e.g., a DNS server or a reverse proxy server), which performs the load balancing based upon the loading information provided. One or more controllers 135 may also be provided to configure one or more load monitors 125 by distribution of policies, and to receive network statistics from one or more load monitors 125. For example, in a large network system 120, multiple controllers 135 may control multiple load monitors 125 and may communicate among themselves in order to gain knowledge regarding the functioning of the entire network system 120 (e.g., information regarding bandwidth capacity, network topology, etc.).

Figure 2A:
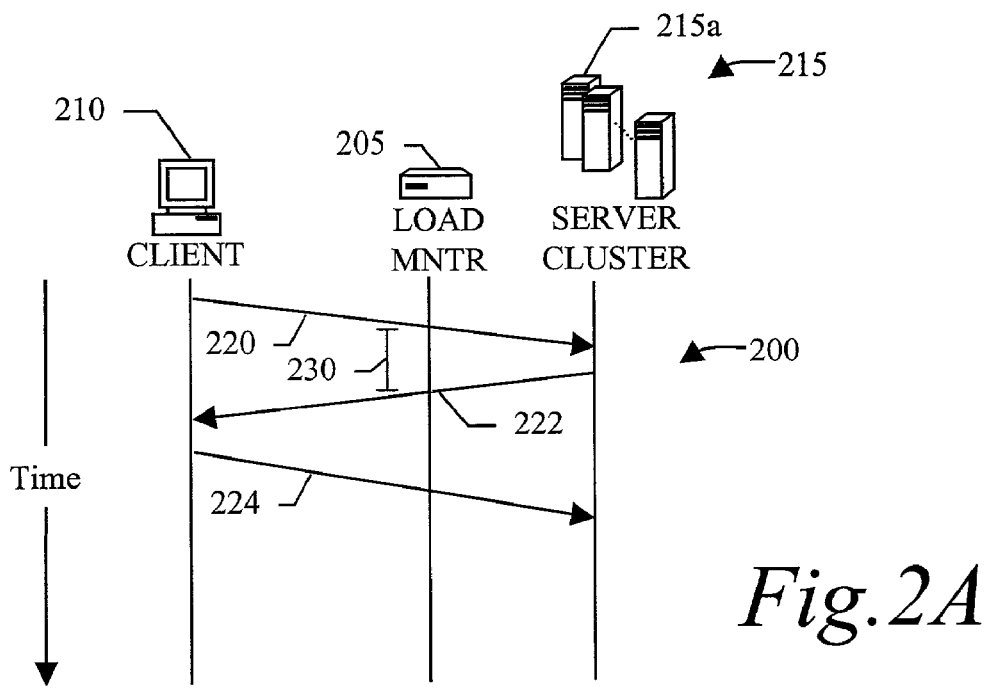
FIGS. 2A and 2B are timing diagrams illustrating Transmission Control Protocol (TCP) connection establishment in an IP network employing server load balancing.
Figure 2B:
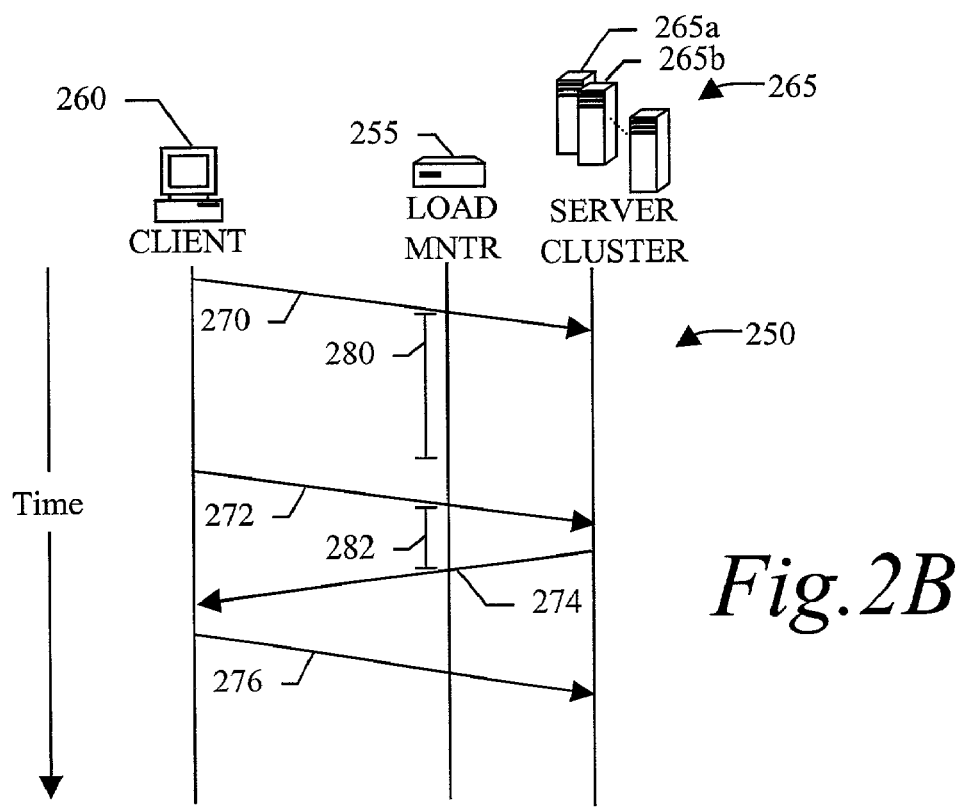

FIGS. 2A and 2B are timing diagrams 200, 250 illustrating Transmission Control Protocol (TCP) connection establishment in an IP network employing server load balancing. FIG. 2A shows a standard IP "three-way handshake" with no time-outs. A client 210 sends a synchronization message 220 to a server cluster 215 requesting a connection. In IP, the synchronization message 220 is known as a SYN segment because the segment has a SYN flag set, indicating a desire on the part of the client 210 to synchronize sequence numbers, thereby establishing a connection; a SYN segment also includes the client's initial sequence number (ISN).

The server cluster 215 responds by sending an acknowledgement message 222. The acknowledgement message 222 has an acknowledgement (ACK) flag set and contains the client's ISN plus one. The acknowledgement message 222 is also a SYN segment containing the server cluster's ISN.

A load monitor 205 measures a time 230 between the synchronization message 220 and the acknowledgement message 222. The manner in which the load monitor measures the time 230 may vary with different implementations. For example, the time 230 may be the difference between a time at which the load monitor 205 sees the synchronization message 220 and a time at which the load monitor 205 sees the acknowledgement message 222. Alternatively, the time 230 may be measured using one or more time stamps within the messages.

Once the client 210 receives the acknowledgement message 222, the client 210 sends a reply acknowledgement message 224 to the server cluster 215. The reply acknowledgement message 224 has the ACK flag set and contains the server cluster's ISN plus one. The sequence numbers are used by the client 210 and the server cluster 215 to identify the established connection. If packets get delayed in the network, they will not be misinterpreted as part of a later connection.

The ISN for the server cluster 215 may or may not be for a specific server 215a within the cluster 215. For example, the connection request 220 may result in an assignment of a server 215a, and that server 215a may then communicate directly with the client 210 through the network, using an ISN generated by the server 215A.

Alternatively, the connection request 220 may result in an assignment of a server 215a by the load monitor 205, and that server 215a may then communicate with the client 210 through the load monitor 205. In this later case, the load monitor creates the ISN to be sent to the client 210 in the acknowledgement message 222 and handles any necessary translation of sequence numbers sent by the server 215a into the sequence numbers sent to the client 210. In some cases, the server 215a may not provide sequence numbers (e.g., if the server cluster 215 resides on a single Ethernet network and the load monitor 205 handles all communications with requesting clients, then server sequence numbers need not be used).

FIG. 2B shows an IP "three-way handshake" with a single time-out (by both a client 260 and a load monitor 255) in a timing diagram 250. The client 260 sends a synchronization message 270 to a server cluster 265 requesting a connection. The server cluster fails to respond within a time-out period 280.

In this example, both the client 260 and the load monitor 255 are using the same time-out period. However, various time-out periods and combinations of time-out periods may be used. For example, the client 260 may use three time-out periods with three synchronization messages in attempting to establish a connection (a first time-out period (e.g., six seconds) measured from an initial request, a second time-out period (e.g., twelve seconds) measured from the end of the first time-out period, and a third time-out period (e.g., seventy-five seconds) measured from the initial request), while the load monitor 255 may use a single time-out period that is much shorter (e.g., 500 milliseconds).

The client 260 sends a second synchronization message 272 to the server cluster 265 requesting a connection. The server cluster 265 responds with an acknowledgement message 274. The load monitor 255 measures a time 282 between the second synchronization message 272 and the acknowledgement message 274, as described previously. Once the client 260 receives the acknowledgement message 274, the client 260 sends a reply acknowledgement message 276 back to the server cluster 265.

The synchronization message 270 and the second synchronization message 272 may or may not be received by the same server within the server cluster 265. For example, when the load monitor 255 determines that an assigned server 265a has failed to respond to a connection request within the time-out period 280, the load monitor 255 may cause the server 265a to be removed from contention for future connection requests. In that case, when the second synchronization message 274 arrives, a different server, e.g., server 265b, will respond.

Moreover, the assigned server 265a may be taken out of a connection at other times. For example, if the time-out period 280, used by the load monitor 255, is much shorter than a time-out period used by the client 260, the synchronization message 270 may result in a timeout for a server well before the client timeout. The load monitor 255 may then transmit a new connection request to a different server, and this different server then replies to the client 260 before the client's time-out period expires. Thus, the client's single request results in two requests being received by two separate servers.

Alternatively, the load monitor 255 may determine that a server 265a, which is in established communication with a client 260, is becoming overloaded or has crashed, and reassign the existing connection to another server 265b. The load monitor 255 may assess overloading of a server using one or more factors, including the server's response time, the number of connections the server is managing, and the amount of bandwidth the server's connections are consuming.

Figure 3A:
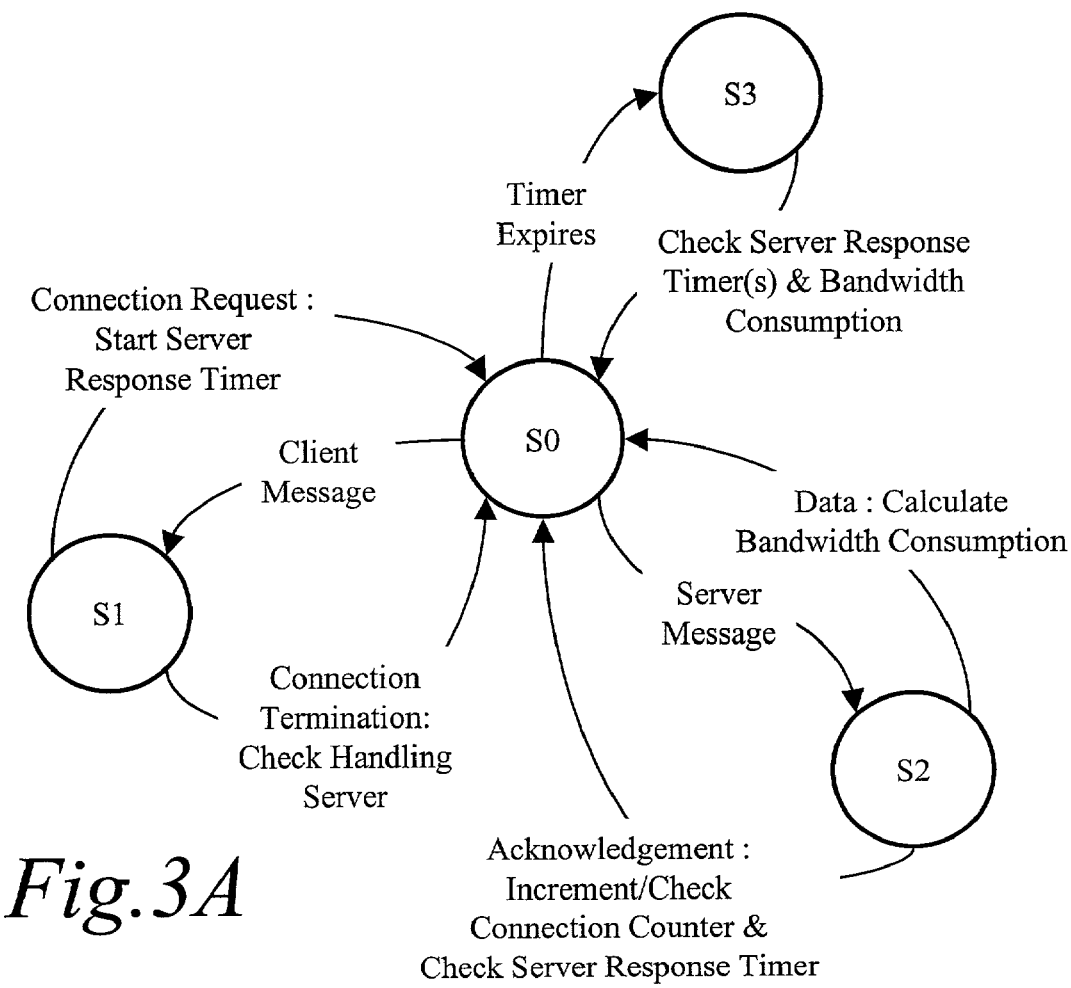
FIGS. 3A and 3B are state diagrams illustrating respectively a procedure for monitoring load on servers in a server cluster and for adjusting assignments of connection requests.
Figure 3B:
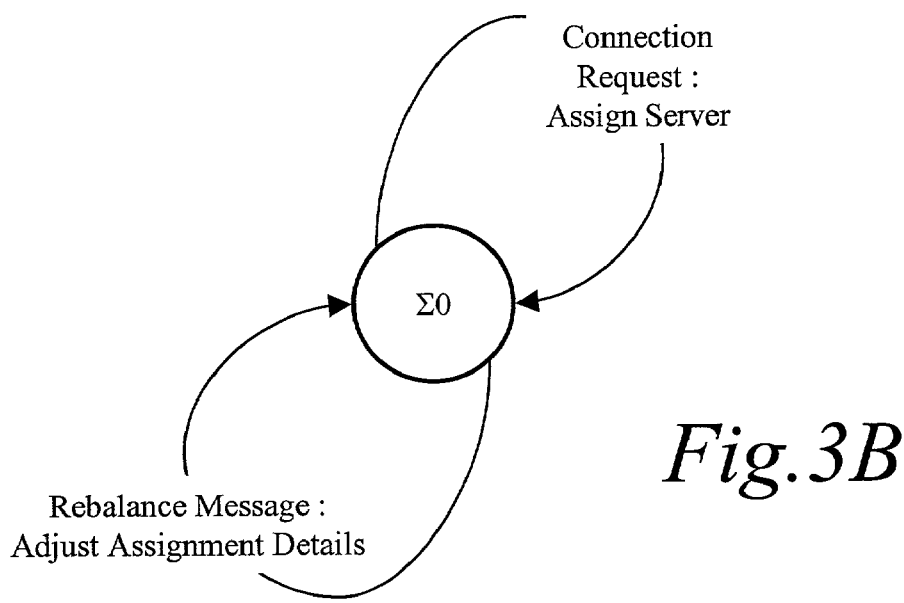

FIGS. 3A and 3B are state diagrams illustrating a procedure for monitoring load on servers in a server cluster and for adjusting assignments of connection requests. FIG. 3A illustrates a procedure performed by an example load monitor to track load on servers in a server cluster and to generate messages to cause rebalancing of server load. FIG. 3B illustrates a procedure performed by an example connection assignor to assign new connection requests to the servers based upon the messages received from the load monitor.

The connection assignor may be a software process executing in a load monitor or in an entirely separate device. Although FIGS. 3A and 3B depict the procedures for monitoring server loads and for adjusting connection request assignments separately, they need not be performed separately but rather may be performed in the same procedure. A single load monitor may perform all of the functions described here, including assignment of new connection requests.

Referring now to FIG. 3A, state S0 is an initial state for the load monitor. When a client message is identified, a transition is made from state S0 to state S1. In state S1, the client message is input data for the next transition. If the client message is a connection request (e.g., a SYN segment in IP), a server response timer is started for this connection request, and a transition is made back to state S0.

If the client message is a connection termination (e.g., a FIN (finished) segment in IP), a current state of a server handling this connection is checked, a rebalancing message may be sent, and a transition is made back to state S0. Any other type of client message results in a transition back to state S0 with no processing or output. The processes and outputs of state S1 are described in greater detail below in connection with FIG. 3C.

When a server message is intercepted while the load monitor is in state S0, a transition is made to state S2. In state S2, the server message is input data for the next transition. If the server message is a connection acknowledgment (e.g., a SYN-ACK segment in IP), a connection count is incremented and checked, the server response timer is checked, a rebalancing message may be sent, and a transition is made back to state S0. If the server message contains any other data, a current bandwidth consumption is calculated, and a transition is made back to state S0. The processes and outputs of state S2 are described in greater detail below in connection with FIG. 3D.

When a timer expires while the load monitor is in state S0, a transition is made to state S3. In state S3, a check is made for any outstanding connection requests that have not been responded to in a timely fashion, a check is made for excessive bandwidth consumption, a rebalancing message may be sent, and a transition is made back to state S0. The timer that expired may be a programmed interrupt timer, such as the server response timer, and/or it may be a periodic interrupt timer that causes state S3 to be entered regularly to make checks including checking a set of server response timers, which may be memory locations storing connection request times.

Referring now to FIG. 3B, state 0 is an initial state for the connection assignor. When a connection request is received from a client, a server is assigned to the connection request, and a transition is made back to state 0. When a rebalancing message is received from the load monitor, assignment details are adjusted based upon the rebalancing message.

For example, if servers are assigned in a round robin fashion, the rebalancing message may instruct the connection assignor to remove a particular server from the circle for a specified period of time or until a later rebalancing message indicates otherwise. Thus, a rebalancing message can cause a server to be taken offline for new connections temporarily or indefinitely.

Figure 3C:
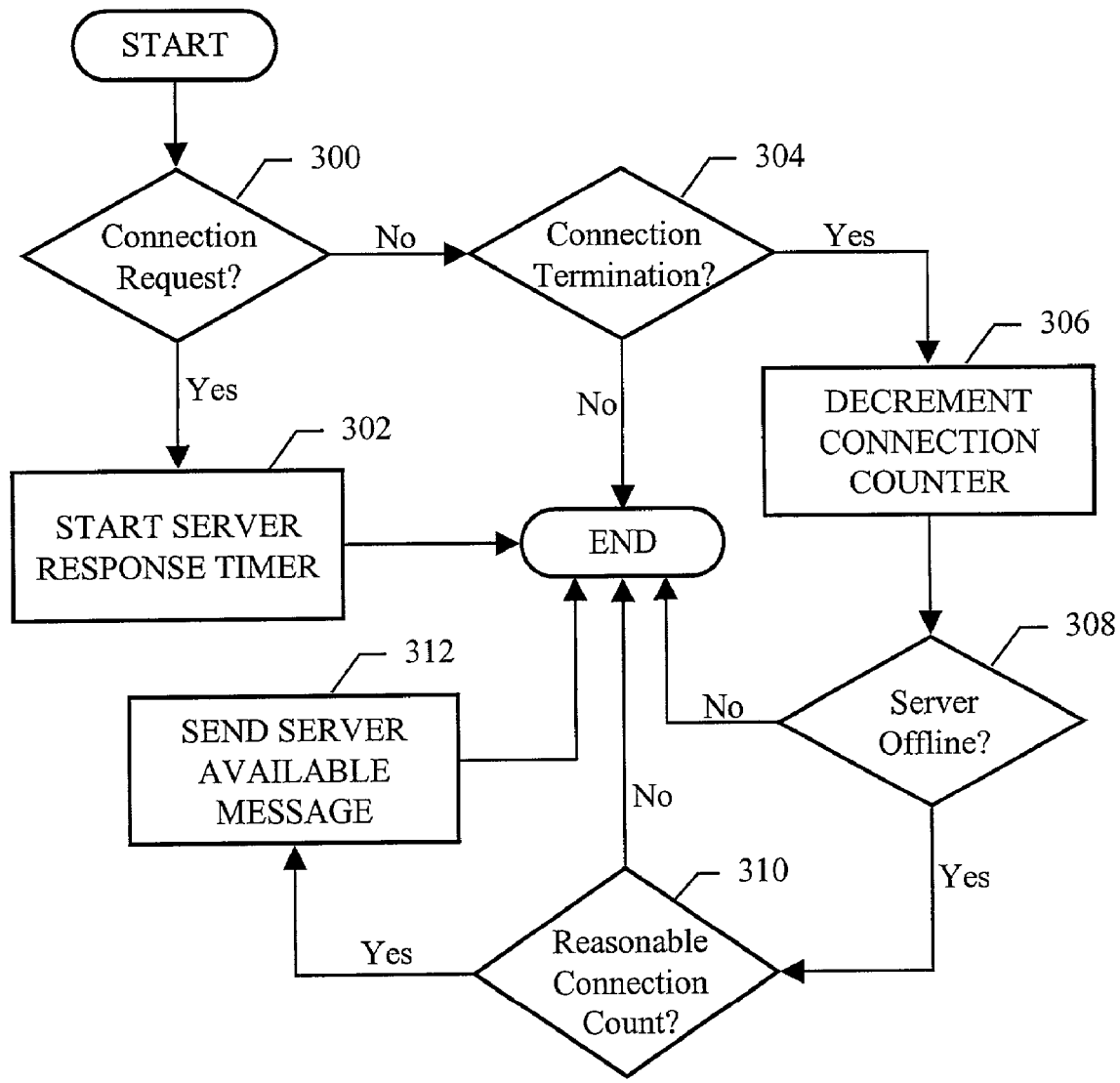
FIGS. 3C, 3D and 3E are logic flow diagrams illustrating additional details regarding the states and transitions of FIGS. 3A and 3B.
Figure 3D:
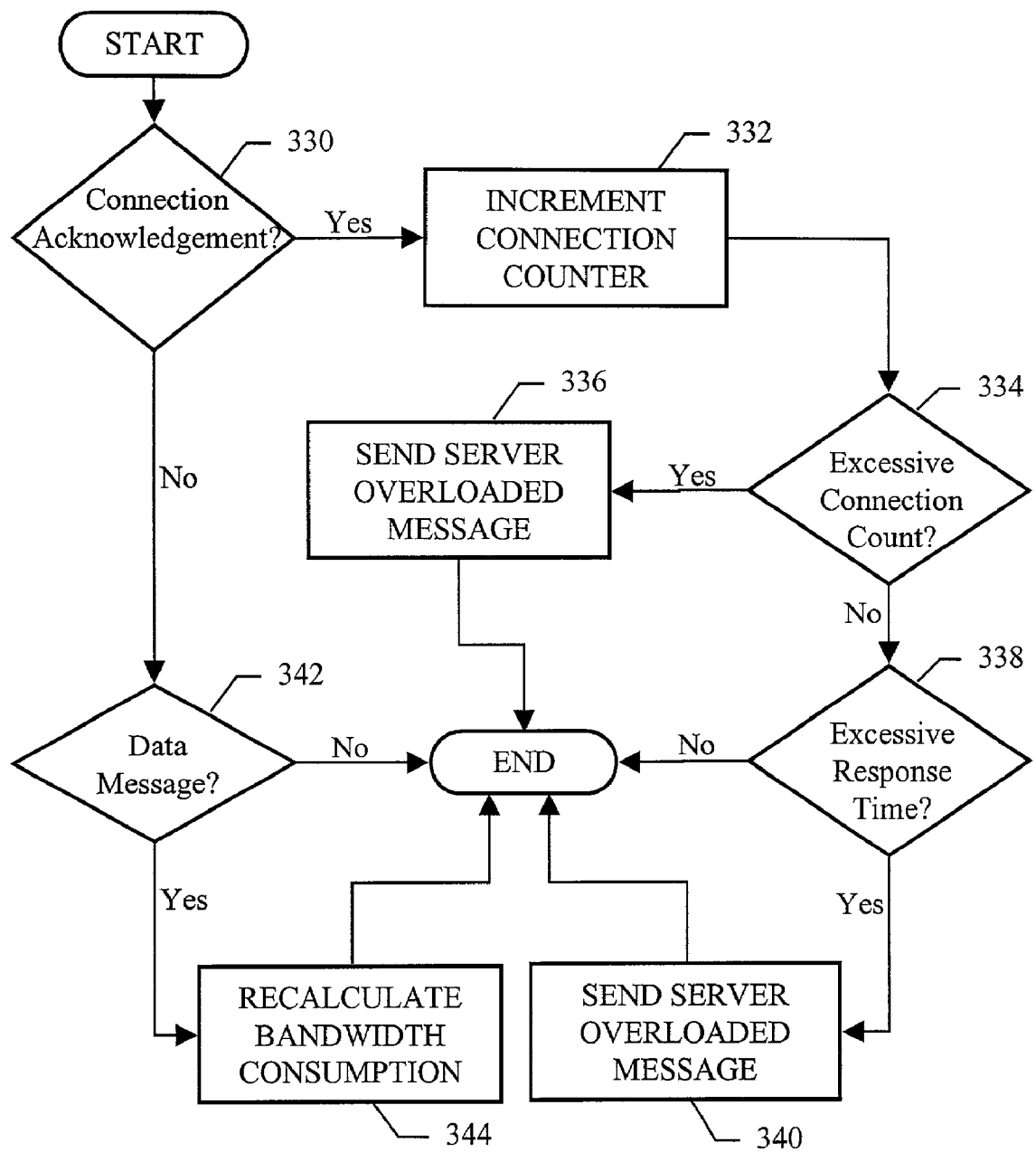
Figure 3E:
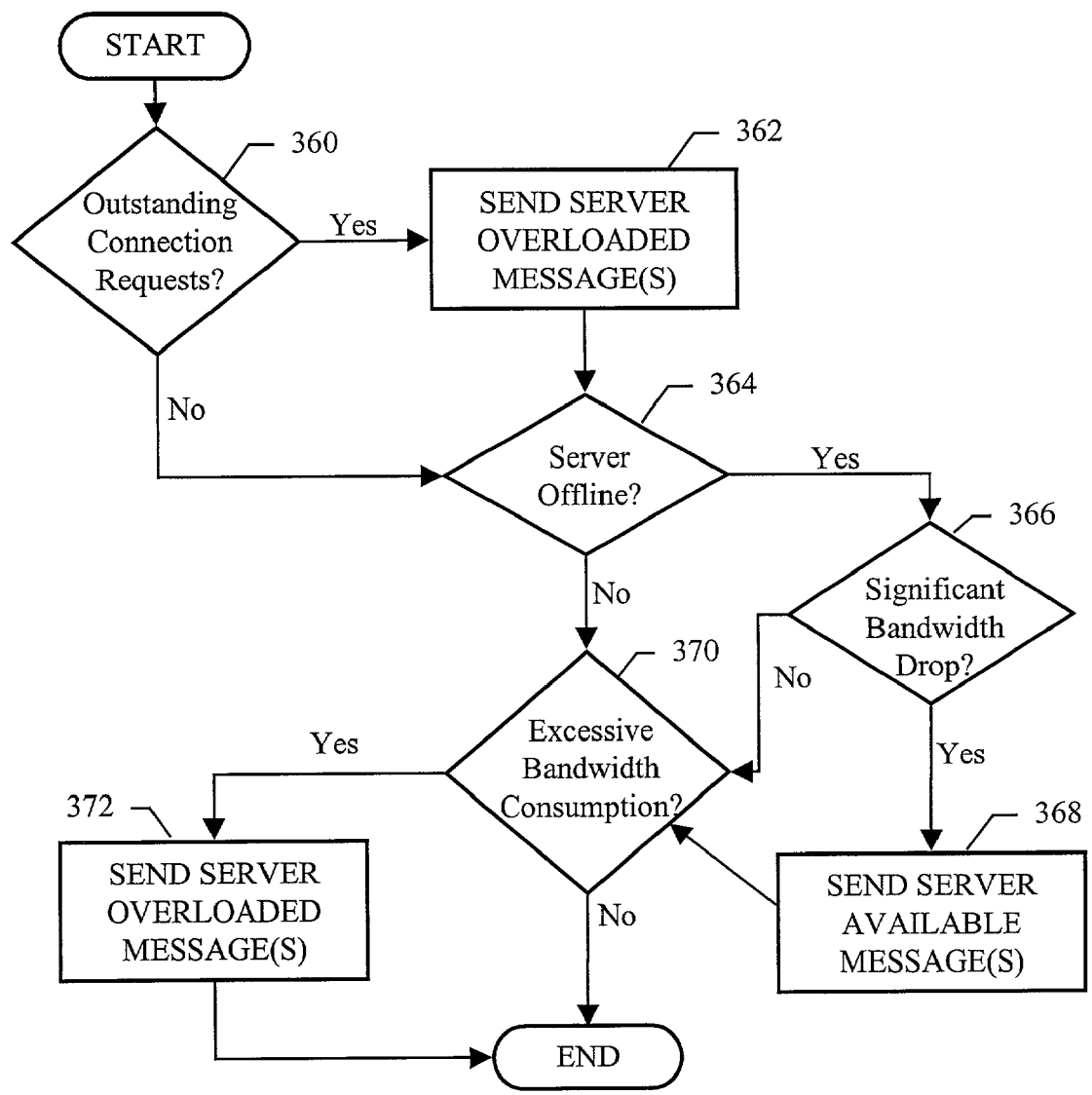

FIGS. 3C, 3D and 3E are logic flow diagrams illustrating details of the states and transitions of FIGS. 3A and 3B.

FIG. 3C is a logic flow diagram illustrating the processes and outputs of state S1. The process begins at block 300, in which a client message is checked to determine if it is a connection request. If so, control passes to block 302. If not, control passes to block 304.

In block 302, a server response timer for this connection request is started. This timer may be implemented as a time stamp stored in a variable or memory location for later checking. Alternatively, the timer may be an actual interrupt timer, which interrupts the other processes after a prescribed period. Following block 302, the process ends.

In block 304, a check is made to determine if the client message is a connection termination message. If not, the process ends. If so, control passes to block 306.

Although connection termination is described here as occurring upon the request of the client, other scenarios are possible. For example, in a full duplex connection, such as TCP, a server considers a connection to be open even after the client has terminated its transmissions. In that case, a server termination message would need to be intercepted to trigger the processes shown in blocks 304–312.

In block 306, a connection counter is decremented for the server handling the client that sent the connection termination request. Then, in block 308, a check is made to determine if this particular server is currently offline for new connections, for example, due to excessive connections or possibly due to a previous failure to respond to a connection request. If not, the process ends. If so, control passes to block 310.

In block 310, a check is made to determine if the current connection count for the server determined to be offline is reasonable. If not, the process ends. If so, control passes to block 312. A number that is considered reasonable will depend on the particular implementation, and/or on the preferences of the system administrator, and may depend upon the underlying reason that the server is offline. For example, if the server is currently offline for new connections because it reached its maximum number of connections, the reasonable number may be set to be a predetermined number less than the maximum, for example, the maximum number minus two. If the server is currently offline for new connections because of a previous failure to respond to a connection request, the reasonable number may be a percentage of the maximum, for example, seventy five percent.

Block 310 may also include checks of current server bandwidth consumption. For example, if the server is currently offline for new connections because of a previous failure to respond to a connection request, a check may be made in block 310 to determine if both the number of connections being handled by the server and the bandwidth being consumed by the server are reasonable.

In block 312, a server available message is sent. This message indicates that the server is now available for new connection requests. Following this, the process ends.

FIG. 3D is a logic flow diagram illustrating the processes and outputs of state S2. The process begins at block 330, in which a server message is checked to determine if it is a connection acknowledgement. If so, control passes to block 332. If not, control passes to block 342.

In block 332, the connection counter for the server sending the acknowledgement message is incremented. Then, in block 334, a check is made to determine if the current connection count is excessive, for example, greater than a predetermined number. If so, control passes to block 336, in which a server overloaded message is sent. Then the process ends.

A number that is considered excessive for the connection count will depend on the particular implementation and may also depend upon the current bandwidth consumption for the server. The server overloaded message sent in block 336 indicates that the server is unavailable for new connections. This unavailability may be temporary or indefinite. For example, the server overloaded message may indicate removal of this server from contention for new connections for a specified period of time, or the server overload message may indicate removal of this server from contention for new connections until a future message indicates otherwise.

If the current connection count was determined not excessive in block 334, then a check is made in block 338 to determine if the server response took an excessive amount of time, for example, longer that a predetermined duration. If not, the process ends. If so, control passes to block 340, in which a server overloaded message is sent.

An amount of time to respond that is considered excessive will depend on the particular implementation. For example, if the server resides on a fast Ethernet network, a reasonable response time may be 500 milliseconds or less. Moreover, the reasonable response time may be server dependent. For example, a load monitor may keep historical information for each server that indicates how long on average each server takes to respond. Server overload may then be identified in block 338 upon detecting a response time that is slower than the historical average.

In block 342, a check is made to determine if the server message is a data message. If not, the process ends. If so, control passes to block 344, in which the current bandwidth consumption is recalculated for the server sending the message. Then, the process ends. Alternatively, no check is made in block 342, and all server messages result in a recalculation of server bandwidth consumption.

FIG. 3E is a logic flow diagram illustrating the processes and outputs of state S3. The process begins at block 360, in which a check is made to determine if there are any outstanding connection requests. An outstanding connection request is any client connection request that has not been responded to by a server within a predetermined time-out period or duration. If there are outstanding connection requests, control passes to block 362. If not, control passes to block 364.

In block 362, a server overloaded message is sent for each server having outstanding responses. These messages indicate that each server having outstanding responses is unavailable for new connection requests, either temporarily or indefinitely. These messages also may indicate that the outstanding connection requests are to be reassigned to available servers. Following this, control passes to block 364.

In block 364, a check is made to determine if there are servers, other than a server taken offline in block 362 just immediately before, that are offline for new connection requests. If not control passes to block 370. If so, control passes to block 366.

In block 366, a check is made for each server identified in block 364, to determine if the server has experienced a significant drop in bandwidth consumption. An amount of bandwidth consumption that is considered significant will depend on the particular implementation and factors including network capacity and number of servers. If no offline server has experienced a significant drop in bandwidth consumption, control passes to block 370. Otherwise, control passes to block 368.

In block 368, a server available message is sent for each offline server experiencing a significant drop in bandwidth consumption. These messages indicate that each such server is now available for new connection requests. Following this, control passes to block 370.

In block 370, the bandwidth consumption for each server is checked to determine if a server should be taken offline for new connections due to excessive bandwidth consumption. If so, control passes to block 372. If not, the process ends.

In block 372, a server overloaded message is sent for each server consuming excessive bandwidth. These messages indicate that each such server is unavailable for new connection requests, either temporarily or indefinitely. Following this, the process ends.

Figure 4:
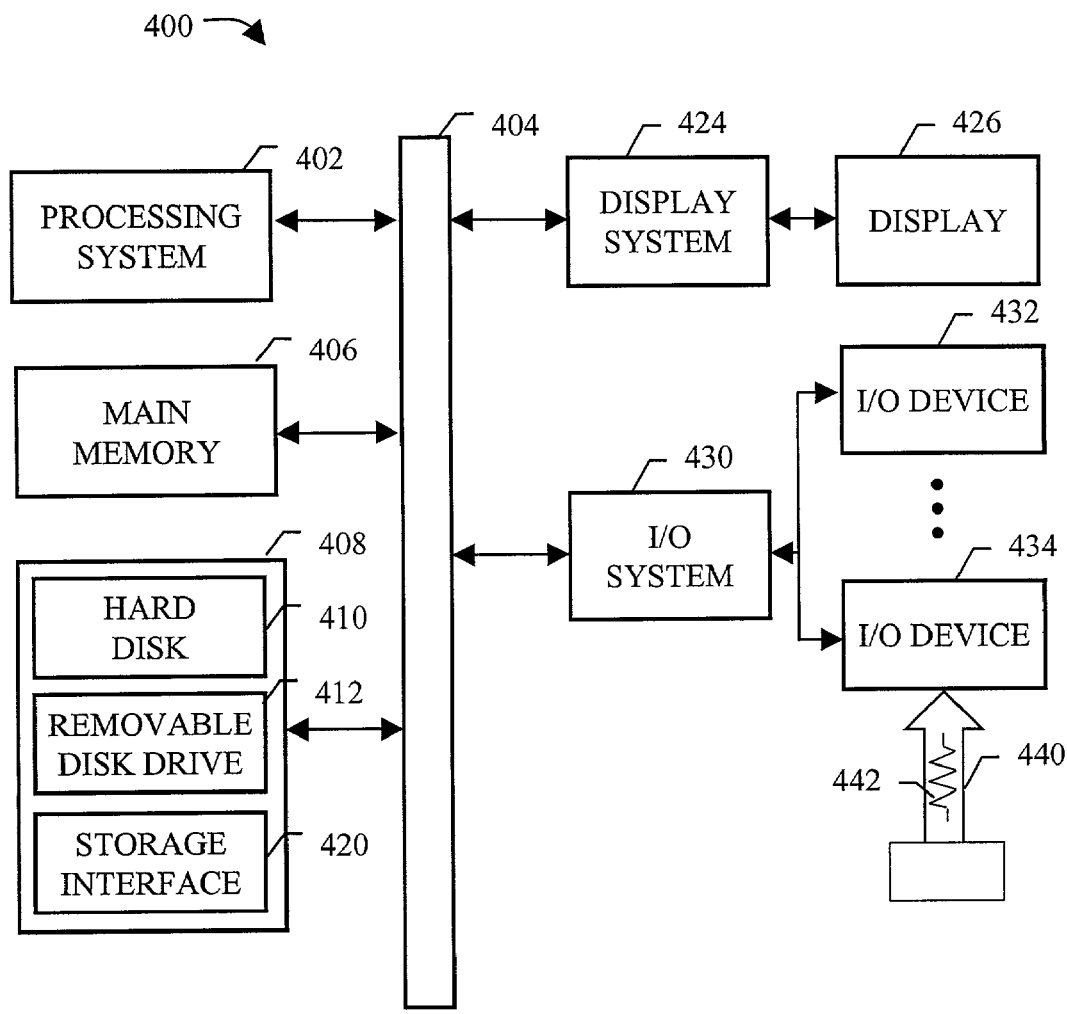
FIG. 4 is a block diagram illustrating an example computing environment.

FIG. 4 is a block diagram illustrating an example computing environment. An example machine 400 includes a processing system 402, which may include a central processing unit such as a microprocessor or microcontroller for executing programs to control tasks in the machine 400, thereby enabling the features and function described above. Moreover, the processing system 402 may include one or more additional processors, which may be discrete processors or may be built in to the central processing unit.

The processing system 402 is coupled with a bus 404, which provides a set of signals for communicating with the processing system 402 and may include a data channel for facilitating information transfer between storage and other peripheral components of the machine 400.

The machine 400 may include embedded controllers, such as Generic or Programmable Logic Devices or Arrays (PLD, PLA, GAL, PAL), Field Programmable Gate Arrays (FPGA), Application Specific Integrated Circuits (ASIC), single-chip computers, smart cards, or the like, which may serve as the processing system 402.

The machine 400 may include a main memory 406 and one or more cache memories, and may also include a secondary memory 408. These memories provide storage of instructions and data for programs executing on the processing system 402, and may be semiconductor based and/or non-semiconductor based memory. The secondary memory 408 may include, for example, a hard disk drive 410, a removable storage drive 412 and/or a storage interface 420.

The machine 400 may also include a display system 424 for connecting to a display device 426. The machine 400 includes an input/output (I/O) system 430 (i.e., one or more controllers or adapters for providing interface functions) for connecting to one or more I/O devices 432–434. The I/O system 430 may provide a communications interface, which allows software and data to be transferred, in the form of signals 442, between machine 400 and external devices, networks or information sources. The signals 442 may be any signals (e.g., electronic, electromagnetic, optical, etc.) capable of being received via a channel 440 (e.g., wire, cable, optical fiber, phone line, infrared (IR) channel, radio frequency (RF) channel, etc.). A communications interface used to receive these signals 442 may be a network interface card designed for a particular type of network, protocol and channel medium, or may be designed to serve multiple networks, protocols and/or channel media.

Machine-readable instructions (also known as programs, software or code) are stored in the machine 400 and/or are delivered to the machine 400 over a communications interface. As used herein, the term "machine-readable medium" refers to any media used to provide one or more sequences of one or more instructions to the processing system 402 for execution.

Other systems, architectures, and modifications and/or reconfigurations of machine 400 of FIG. 4 are also possible. The various implementations described above have been presented by way of example only, and not limitation. For example, the logic flows depicted in FIGS. 3A–3E do not require the particular order shown. Multi-tasking and/or parallel processing may be preferable. Thus, other embodiments may be within the scope of the following claims.

What is claimed is:

1. A system comprising:
   a communications interface configurable to monitor messages on a network;
   a processor coupled with the communications interface; and
   a machine-readable medium coupled with the processor, the machine-readable medium being configured to instruct the processor to access machine-readable instructions to cause the processor to perform operations including,
   identifying a message requesting a connection with a data delivery system having a plurality of nodes,
   initiating a tracking of a duration after the message identification, and
   identifying a node of the data delivery system as being overloaded, based upon the tracked duration, to facilitate adjusting assignment of connection requests to the node,
   wherein the tracked duration comprises an amount of time between a time associated with the message requesting the connection and either a time associated with an acknowledging message from the node, which is used to establish the connection with the node, or a termination of a time-out period during which no acknowledging message is returned by the node.

2. The system of claim 1, wherein the operations further include balancing load among the plurality of nodes in the data delivery system.

3. The system of claim 2, wherein balancing load among the plurality of nodes comprises removing the overloaded node from contention for new connections.

4. The system of claim 3, wherein removing the overloaded node comprises transmitting a message to initiate a removal.

5. The system of claim 2, wherein the tracked duration comprises an amount of time between the message identification and either an identification of an acknowledging message from the node or a termination of a time-out period during which no acknowledging message is returned by the node.

6. The system of claim 5, wherein the node identifying operation comprises comparing the tracked duration to an historical average for the node.

7. The system of claim 5, wherein the communications interface comprises an Ethernet card.

8. The system of claim 7, wherein the network comprises an Internet Protocol network.

9. The system of claim 8, wherein the data delivery system comprises a web server cluster.

10. A computer implemented method of adjusting assignment of connection requests to nodes in a data delivery system, the method comprising:
    monitoring messages on a network;
    identifying a message requesting a connection with a data delivery system having multiple nodes;
    initiating a tracking of a duration after the message identification; and
    adjusting assignment of connection requests based upon the tracked duration,
    wherein the tracked duration comprises an amount of time between a time associated with the message requesting the connection and either a time associated with an acknowledging message from a node, which is used to establish the connection with the node, or a termination of a time-out period during which no acknowledging message is returned by the node.

11. The method of claim 10, wherein the tracked duration comprises an amount of time between the message identification and either an identification of an acknowledging message from an assigned node in the data delivery system or a termination of a time-out period during which no acknowledging message is returned by the assigned node.

12. The method of claim 11, wherein the adjusting comprises:
    identifying the assigned node as overloaded; and
    removing the assigned node from contention for new connections.

13. The method of claim 12, wherein the node-overloaded identification comprises comparing the tracked duration to an historical average for the assigned node.

14. The method of claim 12, wherein the removing comprises transmitting a message to initiate a removal.

15. The method of claim 10, wherein the adjusting of assignment of connection requests is further based upon a bandwidth consumption.

16. The method of claim 15, wherein the adjusting comprises:
- identifying an assigned node as overloaded if the tracked duration exceeds a maximum time;
- removing the assigned node from contention for new connections if the assigned node is identified as overloaded;
- identifying a removed node as available to service new connection requests if a bandwidth consumption for the removed node drops; and
- reinstating the removed node to receive new connection requests if the removed node is identified as available to service new connection requests.

17. The method of claim 16, wherein the adjusting further comprises:
- identifying the assigned node as overloaded if a number of connections for the assigned node exceeds a maximum connections;
- identifying the assigned node as overloaded it the bandwidth consumption for the assigned node exceeds a maximum bandwidth; and
- identifying the removed node as available to service new connection requests if the number of connections for the removed node drops below the maximum connections.

18. The method of claim 17, wherein the maximum time, the maximum connections and the maximum bandwidth are each node-specific.

19. The method of claim 10, wherein the data delivery system comprises a web server cluster.

20. Computer readable instructions, tangibly embodied in a computer readable medium, that when performed cause a computing machine to perform operations comprising:
- monitoring messages on a network;
- identifying a message requesting a connection with a data delivery system having multiple nodes;
- initiating a tracking of a duration after the message identification; and
- adjusting assignment of connection requests based upon the tracked duration,
- wherein the tracked duration comprises an amount of time between a time associated with the message requesting the connection and either a time associated with an acknowledging message from a node, which is used to establish the connection with the node, or a termination of a time-out period during which no acknowledging message is returned by the node.

21. The instructions of claim 20, wherein the tracked duration comprises an amount of time between the message identification and either an identification of an acknowledging message from an assigned node in the data delivery system or a termination of a time-out period during which no acknowledging message is returned by the assigned node.

22. The instructions of claim 21, wherein the adjusting comprises:
- identifying the assigned node as overloaded; and
- removing the assigned node from contention for new connections.

23. The instructions of claim 22, wherein the node-overloaded identification comprises comparing the tracked duration to an historical average for the assigned node.

24. The instructions of claim 22, wherein the removing comprises transmitting a message to initiate a removal.

25. A system comprising:
- means for accessing messages on a network;
- means for storing data from the messages; and
- a machine-readable medium tangibly embodying processing means for initiating tracking a duration after a message requesting a connection with a data delivery system having a plurality of nodes, identifying a node from the data delivery system as overloaded based upon the tracked duration, and removing the node from contention for new connections if the node is identified as overloaded,
- wherein the tracked duration comprises an amount of time between a time associated with the message requesting the connection and either a time associated with an acknowledging message from the node, which is used to establish the connection with the node, or a termination of a time-out period during which no acknowledging message is returned by the node.

26. The system of claim 25, wherein the removing comprises transmitting a message to initiate a removal.

27. The system of claim 25, wherein the tracked duration comprises an amount of time between the requesting message and either an acknowledging message from the node or a time-out period during which no acknowledging message is returned by the node.

28. The system of claim 27, wherein the identifying comprises comparing the tracked duration to an historical average for the node.

* * * * *